US008477941B1

(12) United States Patent
Dhanoa et al.

(10) Patent No.: US 8,477,941 B1
(45) Date of Patent: Jul. 2, 2013

(54) MAINTAINING SECURE COMMUNICATION WHILE TRANSITIONING NETWORKS

(75) Inventors: Shingara Singh Dhanoa, Overland Park, KS (US); Bejoy Pankajakshan, Olathe, KS (US); Randolph Keith Hiser, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 1388 days.

(21) Appl. No.: 12/170,966

(22) Filed: Jul. 10, 2008

(51) Int. Cl.
*H04W 12/00* (2009.01)

(52) U.S. Cl.
USPC .......................................... 380/270; 455/411

(58) Field of Classification Search
None
See application file for complete search history.

(56) References Cited

U.S. PATENT DOCUMENTS

| 6,876,747 | B1 * | 4/2005 | Faccin et al. ................. 380/247 |
| 2003/0112977 | A1 * | 6/2003 | Ray et al. ..................... 380/270 |
| 2005/0073964 | A1 * | 4/2005 | Schmidt et al. ............... 370/260 |
| 2005/0202815 | A1 * | 9/2005 | Verma et al. .................. 455/433 |
| 2006/0146792 | A1 * | 7/2006 | Ramachandran et al. .... 370/352 |
| 2006/0154670 | A1 * | 7/2006 | Miyabayashi et al. ........ 455/450 |
| 2008/0022383 | A1 * | 1/2008 | Bobde et al. .................... 726/10 |
| 2008/0031214 | A1 * | 2/2008 | Grayson et al. ............... 370/342 |
| 2008/0311909 | A1 * | 12/2008 | Taaghol et al. ............... 455/436 |

* cited by examiner

*Primary Examiner* — Gilberto Barron, Jr.
*Assistant Examiner* — David Le (57) ABSTRACT

A method and medium are provided for maintaining a secure communication of a media stream as a mobile device transitions from a first network a second network. A request is received from the mobile device to initiate a secure communication with an end point. The endpoint stores a unique identifier of the mobile device and a unique key that is usable to decrypt any securely communicated data received from the mobile device. Data is securely communicated from the mobile device to the end point. The mobile device communicates a second request to securely communicate as it transitions from the first network to the second network. A source identifier is determined from the second request to identify the mobile device as the source. The unique key, previously associated with the mobile device, is utilized to decrypt any data received from the mobile device.

20 Claims, 6 Drawing Sheets

MAINTAINING SECURE COMMUNICATION WHILE TRANSITIONING NETWORKS

INTRODUCTION

Historically, secure communication of data utilizes cryptography keys to encrypt and decrypt secured data. The keys are established with the secured communications session. When a securely communicating mobile device transitions from a first network to a second network, new cryptography keys are needed to securely communicate.

Users may desire to securely communicate data from a mobile device while transitioning from a first network to a second network. It may also be desirable to have a transition that is transparent to the user so that data that is securely communicated on the first network will continue to be securely communicated while transitioning to the second network.

SUMMARY

The present invention is defined by the claims below. A high-level overview of embodiments of the invention are provided here for that reason, to provide an overview of the disclosure.

In a first aspect, a set of computer-useable instructions provides a method of maintaining a secure communication of a media stream that is sent from a mobile device to a routing component that is coupled to an end point, the secure communication being maintained as the mobile device transitions from communicating with a first network to communicating with a second network, wherein the method includes processing signaling information received from the mobile device. The method includes receiving a request from the mobile device to initiate a secure communication with the end point. The mobile device is identifiable by a unique identifier. The method also includes determining whether the routing component is capable of initiating the secure communication with the end point. The method additionally includes receiving an indication from the end point that it has determined that the mobile device is authorized to securely communicate with it. The end point stores the unique identifier incident to authenticating the mobile device, and associates the unique identifier with a generated unique key that is usable to decrypt any securely communicated data received from the mobile device. The method also includes receiving securely transmitted data from the mobile device and communicating the securely transmitted date to the end point. Incident to the mobile device determining to transition from communicating with the first network to communicating with the second network, the method includes receiving from the mobile device a second request to securely communicate with the end point. The method further includes communicating the second request to the end point, which performs an inspection process that includes; determining from the second request a source identifier that identifies a source of the second request, comparing the source identifier with the unique identifier, and when the source identifier matches the unique identifier, then utilizing the unique key to decrypt any data received from the source.

In a second aspect, a set of computer useable instructions provides a method of maintaining a secure communication of a media stream that is sent from a mobile device to a routing component that is coupled to an end point, the secure communication being maintained as the mobile device transitions from communicating with a first network to communicating with a second network. The method includes processing signaling information received from the mobile device. The method also includes receiving a request from the mobile device, by way of the routing component, to initiate a secure communication with the end point, wherein the mobile device is identifiable by a unique identifier. The method additionally includes determining the mobile device is authorized to securely communicate with the end point. The end point stores the unique identifier incident to authenticating the mobile device, and associates the unique identifier with a generated unique key that is usable to decrypt and encrypt data communicated with the mobile device. The method also includes receiving securely transmitted data from the mobile device. Incident to the mobile device determining to transition from communicating with the first network to communicating with the second network, receiving from the mobile device a second request to securely communicate with the end point. The method additionally includes inspecting the second request. The inspection process includes; determining from the second request a source identifier that identifies a source of the second request, comparing the source identifier with the unique identifier, and when the source identifier matches the unique identifier, then utilizing the unique key to decrypt any data received from the source.

In a third aspect, a set of computer useable instructions provides a method of maintaining a secure communication of a media stream that is sent from a mobile device to a routing component that is coupled to an end point, the secure communication being maintained as the mobile device transitions from communicating with a first network to communicating with a second network. The method includes processing signaling information received from the mobile device. The method also includes receiving a first request from the mobile device to initiate a secured communication utilizing, in part, the first network, wherein the first request includes a unique identifier of the mobile device. The method additionally includes determining the mobile device is authorized to securely communicate with the end point. The endpoint is registered with the routing component. The method also includes communicating a digital signature to the mobile device. The method additionally includes storing in association with the unique identifier of the mobile device, a generated unique key that is usable to decrypt and encrypt data communicated with the mobile device. The method also includes receiving securely transmitted data from the mobile device and receiving a second request from the mobile device to maintain the secured communication utilizing, in part, the second network. The second request includes the unique identifier. The method also includes inspecting the second request. The inspection process includes; identifying the unique identifier and locating the unique key associated with the unique identifier. The method includes utilizing the unique key to decrypt and encrypt data securely communicated between the mobile device and the end point.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein.

DETAILED DESCRIPTION

Throughout the description of the present invention, several acronyms and shorthand notations are used to aid the understanding of certain concepts pertaining to the associated system and services. These acronyms and shorthand notations are intended to help provide an easy methodology of communicating the ideas expressed herein and are not meant to limit the scope of the present invention. The following is a list of these acronyms:

| | |
|---|---|
| AES | Advanced Encryption Standard |
| CDMA | Code Division Multiple Access |
| ESN | Electronic Serial Number |
| GSM | Global System for Mobile Communications |
| GPRS | General Packet Radio Service |
| iDEN | Integrated Digital Enhanced Network |
| IETF | Internet Engineering Task Force |
| IMS | IP Multimedia Subsystem |
| IMEI | International Mobile Equipment Identity |
| IMSI | International Mobile Subscriber Identity |
| MSISDNN | Mobile Subscriber Integrated Service Digital Network Number |
| PCS | Personal Communications Service |
| SCTP | Stream Control Transmission Protocol |
| SIP | Session Initiation Protocol |
| TCP | Transmission Control Protocol |
| TDMA | Time Division Multiple Access |
| UDP | User Datagram Protocol |
| UMTS | Universal Mobile Telecommunications System |
| 3GPP | 3rd Generation Partnership Project |
| Wi-Max | Worldwide Interoperability for Microwave Access |

Further, various technical terms are used throughout this description. An illustrative resource that fleshes out various aspects of these terms can be found in *Newton's Telecom Dictionary* by H. Newton, 24$^{th}$ Edition (2008).

Embodiments of the present invention may be embodied as, among other things: a method, system, or computer-program product. Accordingly, the embodiments may take the form of a hardware embodiment, a software embodiment, or an embodiment combining software and hardware. In one embodiment, the present invention takes the form of a computer-program product that includes computer-useable instructions embodied on one or more computer-readable media.

Computer-readable media include both volatile and nonvolatile media, removable and nonremovable media, and contemplates media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Illustrative aspects of the invention will be described in greater detail below. Listing some aspects should not be construed as an indication that other aspects do not exist. But a select listing is provided for illustrative purposes.

Figure 1:
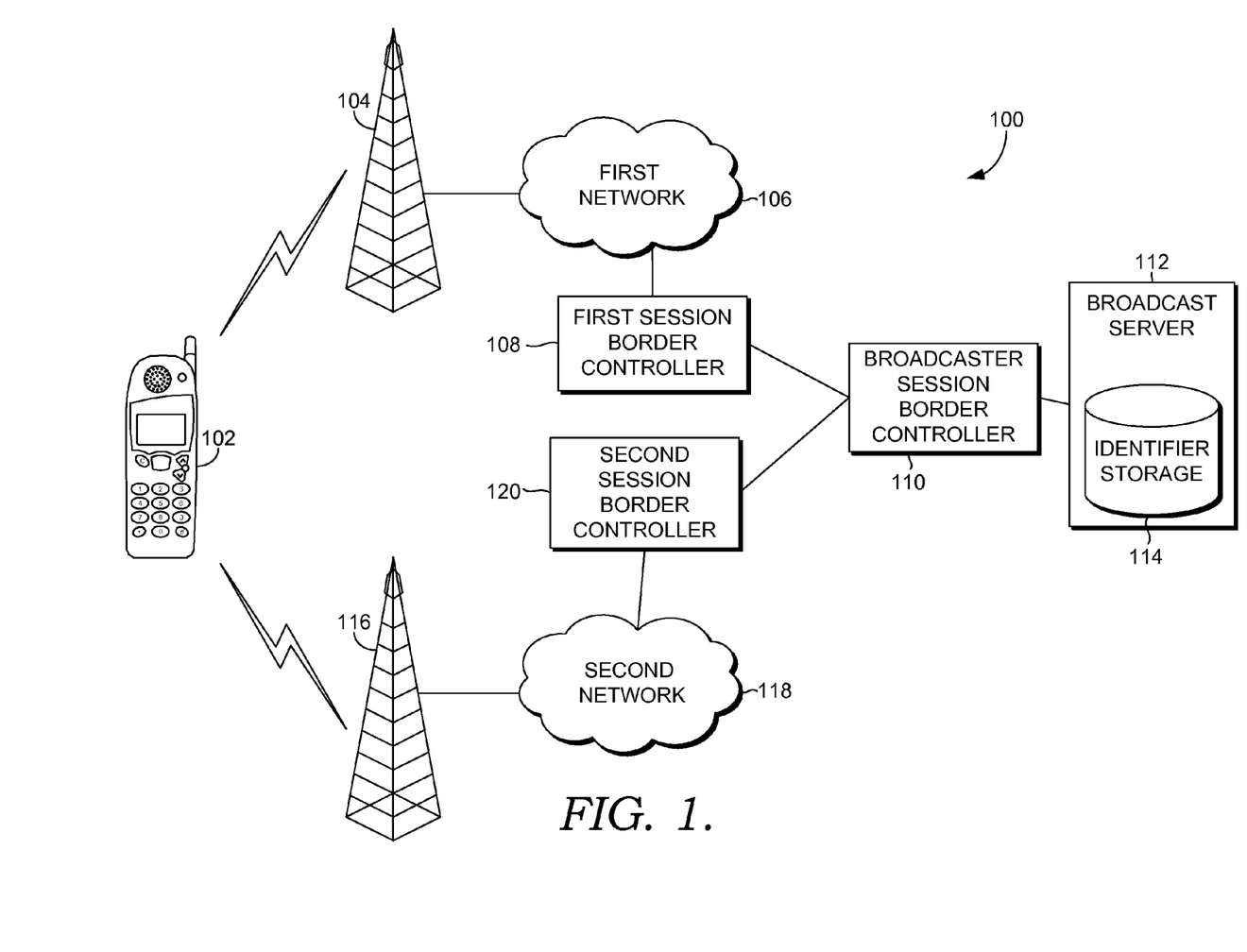
FIG. 1 depicts an exemplary communications network for maintaining communications of a media stream while transitioning from a first network to a second network in accordance with an embodiment of the present invention.

Referring to the drawings in general, and initially to FIG. 1 in particular, an exemplary communications network for maintaining communications of a media stream while transitioning from a first network to a second network is shown and designated generally by numeral 100.

A mobile device is depicted by numeral 102. A mobile device is a computing device that communicates by way of a wireless network. In an exemplary embodiment, the mobile device 102 communicates by way of a wireless telecommunications network. Examples of mobile communication device 102 include cellular phones, video phones, push-to-talk phones, smart phones, Personal Data Assistant (PDA) type phones, and computing devices. The above-listed examples are not exclusive, but merely exemplary embodiments of mobile device 102.

The mobile device 102, in an exemplary embodiment, communicates a media stream. A media stream is a data communication of multimedia content. For example, when video that includes audible information that is captured by the mobile device 102 is communicated from the mobile device 102, the video is a media stream. An additional example includes audio information such as sounds clips, music, ring tones, and the like. Further examples include images (still and moving) that are either located on, viewable at, or communicated from the mobile device 102. Generally, the media stream is an information format that is able to be communicated by way of a wireless telecommunications network.

Mobile device 102 communicates by way of a wireless transceiver, depicted by numeral 104. A wireless transceiver serves as a transceiver for wireless communications between the mobile device 102 and a network. Examples of wireless transceivers include, but are not limited to, a base station transceiver and a Node B. Additional examples of wireless transceivers include wi-fi and wi-max (Worldwide Interoperability for Microwave Access) compatible transceivers. In an exemplary embodiment, the wireless transceiver 102 is considered a component of a wireless telecommunications network to which the mobile device 102 communicates.

A first network is depicted generally by the numeral 106. The first network 106 is a wireless network. In an exemplary embodiment, the first network is a wireless telecommunications network. A wireless telecommunications network refers to any type of telecommunications network that is wireless. Examples of a wireless telecommunications network technologies and protocols that are compatible with the first network 106 include, but are not limited to, Global System for Mobile Communications (GSM), General Packet Radio Service (GPRS), Code Division Multiple Access (CDMA), CDMA2000, CDMAOne, Time Division Multiple Access (TDMA), Universal Mobile Telecommunications System (UMTS), Integrated Digital Enhanced Network (iDEN), Wi-Max, and Personal Communications Service (PCS).

An exemplary embodiment includes a wireless telecommunications network that operates in or about the frequency bands of GSM. GSM networks generally operate in four different frequency ranges. The first two ranges operate in the 900 MHz or 1800 MHz bands. Some countries in the Americas (including Canada and the United States) use the 850 MHz and 1900 MHz bands because the 900 and 1800 MHz frequency bands were already allocated. In the 900 MHz band, the uplink frequency band is 890-915 MHz, and the downlink frequency band is 935-960 MHz. The third and fourth ranges include the 400 and 450 MHz frequency bands.

Another exemplary embodiment includes a wireless telecommunications network that operates in or about the frequency bands of UMTS. The specific frequency bands originally defined by the UMTS standard include 1885-2025 MHz for the mobile-to-base (uplink) and 2110-2200 MHz for the base-to-mobile (downlink). In the United States, 1710-1755 MHz and 2110-2155 MHz are utilized. Additionally, in some countries UMTS operators use the 850 MHz and/or 1900 MHz bands.

Yet another exemplary embodiment includes a wireless telecommunications network that operates in or about the frequency bands of PCS. PCS utilizes the 1900-MHz radio band, which includes the frequency band of 1850-1990 MHz, for digital mobile phone services.

As previously mentioned, the wireless transceiver 104, in an exemplary embodiment, is a component of the first network 106. For example, a wireless transceiver may include a wi-max (Worldwide Interoperability for Microwave Access) wireless router that is connected to an Internet Protocol (IP) compatible network and/or a telecommunications network. Additionally, a wireless transceiver may include a wireless router that is utilized in a small office or home networking environment.

In an exemplary embodiment the first network 106 is a SIP and IP Multimedia Subsystem (IMS) enabled network. SIP is a signaling protocol. The SIP protocol is situated at the session layer in the OSI model, and at the application layer in the TCP/IP model. SIP is designed to be independent of the underlying transport layer; it can run on Transmission Control Protocol (TCP), User Datagram Protocol (UDP), or Stream Control Transmission Protocol (SCTP).

IMS is an architectural framework that allows for communication of Internet Protocol (IP) multimedia to and from mobile device users. IMS allows for the integration of mobile devices with IP networks, such as the Internet. In order to accomplish this integration, IMS utilizes protocols that are compatible with the Internet, such as SIP.

A first session border controller is generally depicted by numeral 108. The first session border controller 108 is a session border controller associated with the first network 106. A routing component includes a session border controller. A session border controller is a component used in some networks to control the signaling and the media streams involved in setting up, conducting, and terminating communications.

Within the context of VoIP, the word Session in Session Border Controller refers to a call. Each call consists of one or more call signaling streams that control the call, and one or more call media streams which carry audio, video, or other data along with information concerning how that data is flowing across the network or multiple networks. Together, these streams make up a session, and it is the job of a session border controller to influence the data streams that make up one or more sessions.

The word "border" in session border controller refers to a point of demarcation between one part of a network and another. For example, at the edge of a corporate network, a firewall demarks the local network (inside the corporation) from the rest of the Internet (outside the corporation). A more complex example is that of a large corporation where different departments have security needs for each location and perhaps for each kind of data. In this example, filtering routers or other network elements are used to control the flow of data streams. It is the job of a session border controller to assist policy administrators in managing the flow of session data across these borders.

In an exemplary embodiment, a session border controller is inserted into a signaling and/or media path between communicating entities. Those entities may be communicating by way of a VoIP (Voice Internet Protocol) call utilizing a SIP (Session Initiation Protocol), H.323, and/or MGCP (Media Gateway Control Protocol) protocol.

Continuing with the exemplary embodiment from above where the communication is a call utilizing a VoIP phone, the session border controller acts as if it was the called VoIP phone and places a second call to the called party. In other terms, when used within the SIP protocol, this is defined as being a Back-to-Back User-Agent. The effect of this behavior is that not only the signaling traffic, but also the media stream can be controlled by the border controller. Without a session border controller, the media traffic travels directly between the VoIP phones, without the in-network call signaling elements having control over their path.

A session border controller performs functions comparable to that of Interrogating-Call Session Control Function (I-CSCF). The functions provide for the session border controller's IP address to be published in the Domain Name System (DNS) of the domain in which the session border controller is located, so that remote servers can find the session border controller. This allows the session border controller to be utilized as a forwarding point (e.g., registering) for signaling packets, such as SIP packets, to this particular domain.

A session border controller provides a topology hiding functionality. Topology hiding hides the internal network from the outside world by encrypting part of the signaling message. Some skilled in the art also refer to this as Topology Hiding Inter-Network Gateway. For example, the first border controller 108 hides the first network 106 by way of topology hiding functionality.

In an exemplary embodiment, topology hiding is accomplished by a session border controller by removing and rewriting any addressing information that is carried in the signaling message headers that would reveal any internal network topology information. To accomplish this, the session border controller operates as a Back-to-Back User Agent. The Back-to-Back User Agent acts as both a User Agent Server (by receiving and processing requests), and as a User Agent Client (by generating requests). The session border controller receives the signaling information from the inner network (such as first network 106), and then generates a new call that is destined for the outer network. During this process, any proprietary topology information of the inner network (such as might be contained within the Record-Route entry) is replaced with information that only identifies the session border controller, and therefore protecting the inner network topology.

In an exemplary embodiment, the mobile device 102 registers on the first network 106 such that the first session border controller 108 is aware of the presence of the mobile device 102. The first session border controller 108 is able to route communications intended for the mobile device 102 that are intercepted by the first session border controller 108 to the mobile device 102 as a result of the registration.

The first session border controller 108 is able to communicate with a broadcaster session border controller, as generally depicted by numeral 110. The broadcaster session border controller 110 is associated with a network utilized by a broadcaster. A broadcaster is an entity that broadcasts, simulcasts, or provides media. Examples of broadcasters include television stations, video depositories, audio distributors, and other entities that provide and receive media. The broadcaster session border controller 110 provides comparable functionality as that previously discussed with respect to the first session border controller 108.

In an exemplary embodiment, the first session border controller 108 and the broadcaster session border controller 110 communicate by way of a network, such as, but not limited to an IP network. An IP network is a computing network that utilizes IP protocol as a network layer protocol. The network may include, without limitation, one or more local networks (LANs) and/or wide area networks (WANs). Such networking environments are commonplace in offices, enterprise-wide computer networks, intranets, and the Internet.

A broadcast server is generally depicted by numeral 112. A broadcast server is a computing device utilized by a broadcaster to distribute and store media. The broadcast server 112 is depicted as a single device, but broadcast server 112 may include one or more computing devices that are either directly or indirectly coupled to one another. In an exemplary embodiment, the broadcast server 112 receives a media stream communicated from the communications device 102. Broadcast server 112 may include one or more processors, memory, and input/output ports.

In an exemplary embodiment, the broadcast server 112 includes a SIP client. A SIP client (also referred to as a SIP stack by those with skill in the art) facilitates communication of signaling information that utilizes a SIP protocol. In an exemplary embodiment, the SIP client provides an interface that allows the broadcast server to receive a media stream communicated from the mobile device 102 by way of the wireless transceiver 104, the first network 106, the first session border controller 108, and the broadcaster session border controller 110. The media stream is associated with SIP signaling and the SIP signaling is utilized in the IMS compatible first network to facilitate communication to the broadcast server 112.

An identifier storage is visually depicted by numeral 114. An identifier storage stores an identifier of a mobile device 102. In an exemplary embodiment, the identifier storage 114 is a log that maintains a unique identifier for each mobile device that is or has been in communication with the broadcast server 112. Examples of a unique identifier for a mobile device include, but are not limited to, an International Mobile Equipment Identity (IMEI), a Mobile Subscriber Integrated Services Digital Network Number (MSISDNN), an International Mobile Subscriber Identity (IMSI), an Electronic Serial Number (ESN), and a Phone Number.

In an exemplary embodiment, the mobile device 102 includes at least one unique identifier with the media stream and/or the signaling information communicated to an endpoint, such as the broadcast server 112. When the broadcast server 112, receives the unique identifier, the unique identifier is stored in the identifier storage 114.

A second wireless transceiver is generally depicted by numeral 116. The second wireless transceiver 116 is comparable to the wireless transceiver 104 previously discussed. The second wireless transceiver 116 is associated with a second network, generally depicted by numeral 118. The second network 118 is comparable to the first network 106 previously discussed. The second network is associated with a second session border controller, generally depicted by numeral 120. The second session border controller 120 is comparable to the first session border controller 108 previously discussed In an exemplary embodiment, the broadcast server 112 registers broadcaster session border controller 110. The registration allows for communications intended for the broadcast server 112 that are intercepted by the broadcaster session border controller 110 to be routed to the broadcast server. The registration of the broadcast server 112 can be facilitated through a SIP client associated with the broadcast server 112. For example, the broadcast server 112 is coupled to the broadcast session border controller by way of a network that is IMS and SIP compatible. The SIP client of the broadcast server 112 registers with the broadcaster session border controller 110 such that IP Security (IPsec), Transport Layer Security (TLS), Secured Sockets Layer (SSL), or other security protocols are utilized to establish a secured connection to the broadcast server.

IPsec is a suite of protocols for securing IP communications by authenticating and/or encrypting each IP packet in a data stream. IPsec also includes protocols for cryptographic key establishment. IPsec is implemented by a set of cryptographic protocols for (1) securing packet flows, (2) mutual authentication and (3) establishing cryptographic parameters.

Continuing with the above example of registering the broadcast server 112 with the broadcaster session border controller 110 utilizing an IMS enabled network that couples the two elements. As a result of the registration, a security token is generated that uniquely identifies the SIP client of the broadcast server 112. For example, the security token allows for the establishment of the secure communication of a media stream from the mobile device 102 to the broadcast server 112 that has the token.

In an exemplary embodiment, mobile device 102 is located within a coverage area of the wireless transceiver 104 when the user of the wireless device 102 requests to communicate a media stream to an endpoint, the broadcast server 112, utilizing a secure communication. The mobile device 102 registers with the first network and then communicates an invite, such as a SIP invite, that includes signaling information. The invite includes a unique identifier of the mobile device 102 as well as information relating to the end point. The first session border controller 108 institutes topology hiding functionality on the request before communicating the request through an IP network to the broadcaster session border controller 110. The broadcaster session border controller 110 receives the request to communicate the media stream. Because the broadcast server 112 previously registered with the broadcaster session controller 110, the request is communicated to the broadcast server 112. Additionally, in an exemplary embodiment, the broadcast server 112 inspects the invite to determine if the broadcast server 112 should accept the invite. The inspection process can include determining if the "TO" portion of the invite is directed to the broadcast server 112, if the broadcast server 112 has a security token, and if the broadcast server 112 can accept a media stream. The invite is received by the broadcast server 112.

The broadcast server 112 verifies the mobile device 102 is authorized to communicate a media stream to the broadcast server 112. The verification may include extracting the unique identifier of the mobile device 102 from the invite. The unique identifier is then compared to a registry of permissions associated with unique identifiers of providers allowed to provide media content to the broadcast server 112.

Once the mobile device 102 is verified as authorized to communicate streaming media to the broadcast server 112, the broadcast server 112 provides a digital signature to the mobile device 102. The mobile device 102 verifies that the digital signature belongs to the broadcast server 112 and then generates symmetric (private) keys to be used by both the mobile device 102 and the broadcast server 112. The symmetric keys are communicated between the mobile device 102 and the broadcast server 112 utilizing asymmetric (public) keys. In an exemplary embodiment, the generated symmetric key is encrypted utilizing the broadcast server's 112 public key which is then decrypted by the broadcast server 112.

The symmetric keys are utilized to encrypt and decrypt communications between the mobile device 102 and the broadcast server 112. For example, the symmetric keys may utilize Advanced Encryption Standard (AES) to encrypt the streaming media. AES is a block cipher encryption method. An example of an asymmetric key encryption technology is the RSA and DSA public key encryption methods.

Asymmetric cryptography is a form of cryptography in which the key used to encrypt a message differs from the key used to decrypt it. In asymmetric cryptography, a user has a pair of cryptographic keys—a public key and a private key. The private key is kept secret, while the public key may be widely distributed. Incoming messages would have been encrypted with the recipient's public key and can only be decrypted with his corresponding private key. The keys are related mathematically, but the private key cannot be practically derived from the public key.

Conversely, symmetric cryptography uses a single secret key for both encryption and decryption. To use symmetric cryptography for communication, both the sender and receiver would have to know the key beforehand, or it would have to be sent along with the message.

Once the encryption keys are created, the identifier storage 114 stores the unique identifier of the mobile device in association with the uniquely created symmetric keys utilized to decipher communications received from the mobile communications device 102.

When the mobile device 102 transfers from the first network 106 to the second network 118 while communicating a media stream, the mobile device 102 sends a re-invite (a second invite) message to the broadcast server 112. The invite message, such as a SIP invite, includes information previously discussed, such as the unique identifier of the mobile device 102 and an identifier of the end point. The unique identifier of the mobile device 102 is a source identifier. Source identifiers also include other identifiers of the mobile device 102, such as those identifiers previously discussed that are also unique identifiers. The broadcaster session border controller 110 receives the invite message and evaluates the invite to determine if the end point is available to receive the media stream. The invite is communicated to the broadcast server 112. The invite is inspected to determine the unique identifier of the mobile device 102. The identifier storage 114 is queried for the unique identifier. When the unique identifier is located with an associated symmetric key, the associated symmetric key is utilized to securely communicate with the mobile device.

It is advantageous for the broadcast server 112 to reference the identifier storage 114 to locate the unique identifier and an associated key because this prevents expending resources to establish the symmetric and asymmetric keys again. Therefore, the mobile device 102 can move from one wireless network to another wireless network, regardless of a change in the service provider of the networks, and continues to securely communicate without having to reestablish the cryptography keys.

While the above example utilized symmetric keys for the encryption of the communicated media stream, it is contemplated that the encryption could also be performed utilizing asymmetric encryption.

Figure 2:
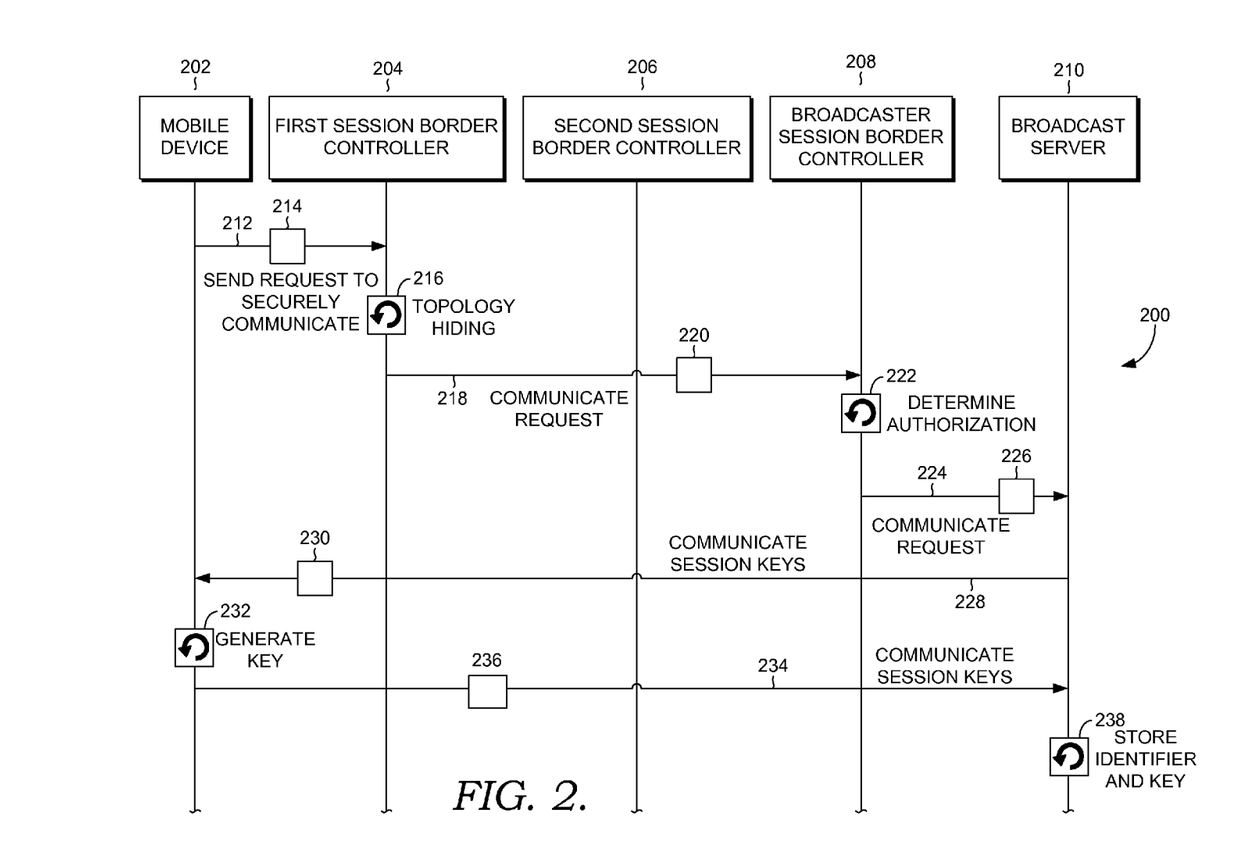
FIG. 2 depicts a communication flow diagram for securely communicating a media stream from a mobile device to an endpoint in accordance with an embodiment of the present invention.

FIG. 2 depicts a communications flow diagram for securely communicating a media stream from a mobile device to an endpoint as generally depicted by numeral 200. The communication flow diagram 200 includes a mobile device, generally depicted by numeral 202, a first session border controller, generally depicted by numeral 204, a second session border controller, generally depicted by numeral 206, a broadcaster session border controller, generally depicted by numeral 208, and a broadcast server, generally depicted by numeral 210. The devices and components depicted with communications flow diagram 200 are comparable to the devices and components of similar name previously discussed with reference to FIG. 1. For example, the mobile device 102 is comparable to the mobile device 202, and the first session border controller 108 is comparable to the first session border controller 204.

The mobile device 202 communicates 212 a request 214 to securely communicate a media stream with an endpoint. In an exemplary embodiment, the request 214 is a SIP invite to establish a secure communication with a SIP enabled endpoint, such as the broadcast server 210. The first session border controller 204 receives the request 214. The first session border controller 204 applies a topology hiding functionality 216 to the request in order to mask information associated with the first network associated with the mobile device 202. A modified request 220, modified by the first session border controller 204, is communicated 218 to the broadcaster session border controller 208. The communication 218, in an exemplary embodiment, is by way of an IP network, such as the Internet. The modified request 220 is received by the broadcaster session border controller 208 to determine the authorization 222 of the mobile device 202 to communicate with the broadcast server 210. The determination of authorization 222 may include referencing a permissions list associated with the broadcasts server 210. A permissions list, as previously discussed, includes a listing of accounts that are authorized to communicate streaming media to the broadcast server 210. The broadcaster session border controller 208 communicates 224 a request 226 that has been determined to be authorized to be communicated to the broadcast server 210. In an exemplary embodiment, modified request 220 and request 226 are comparable requests.

The broadcast server 210 communicates 228 one or more session keys 230 to the mobile device 202. The communication 228 is by way of the broadcaster session border controller 208, which may perform a topology hiding function to the communication 228. Additionally, the communication 228 is communicated by way of the first session border controller 204. The communication 228 may be communicated to the first session border controller 204 as a result of the topology hiding functionality 216 performed earlier. The session keys 230 are received by the mobile device 202. In an exemplary embodiment, the session keys 230 are an asymmetric key that serves as a digital signature that allows the mobile device 202 to verify the identity of the broadcast server 210 as well as serving as a way to encrypt a key generated 232 by the mobile device 202.

In an exemplary embodiment, the generation of session keys 232 includes the generation of symmetric keys that will be utilized by the mobile device 202 and utilized by the broadcast server 210 to decrypt the securely communicated media stream. The mobile device 202 communicates 234 a symmetric key 236 to the broadcast server. The symmetric key 236 may be encrypted utilizing the public key (asymmetric) of the session keys 230 previously communicated by the broadcast server 210. In addition, the communication 234 includes signaling information that includes a unique identifier of the mobile device 202. The unique identifier of the mobile device is comparable to the previously received unique identifier with request 214, modified request 220, and request 226.

The broadcast server 210 receives the symmetric key 236 and stores the unique identifier and the symmetric key 236. In an exemplary embodiment, the broadcast server 210 stores the unique identifier and the symmetric key 236 in the identifier storage 114 previously discussed. Storing of the key and the unique identity allows for the key to be utilized by the broadcast server when another invite is communicated from the mobile device 202 seeking to communicate a secure media stream. This prevents the resources required to communicate and generate the keys from being duplicated.

Figure 3:
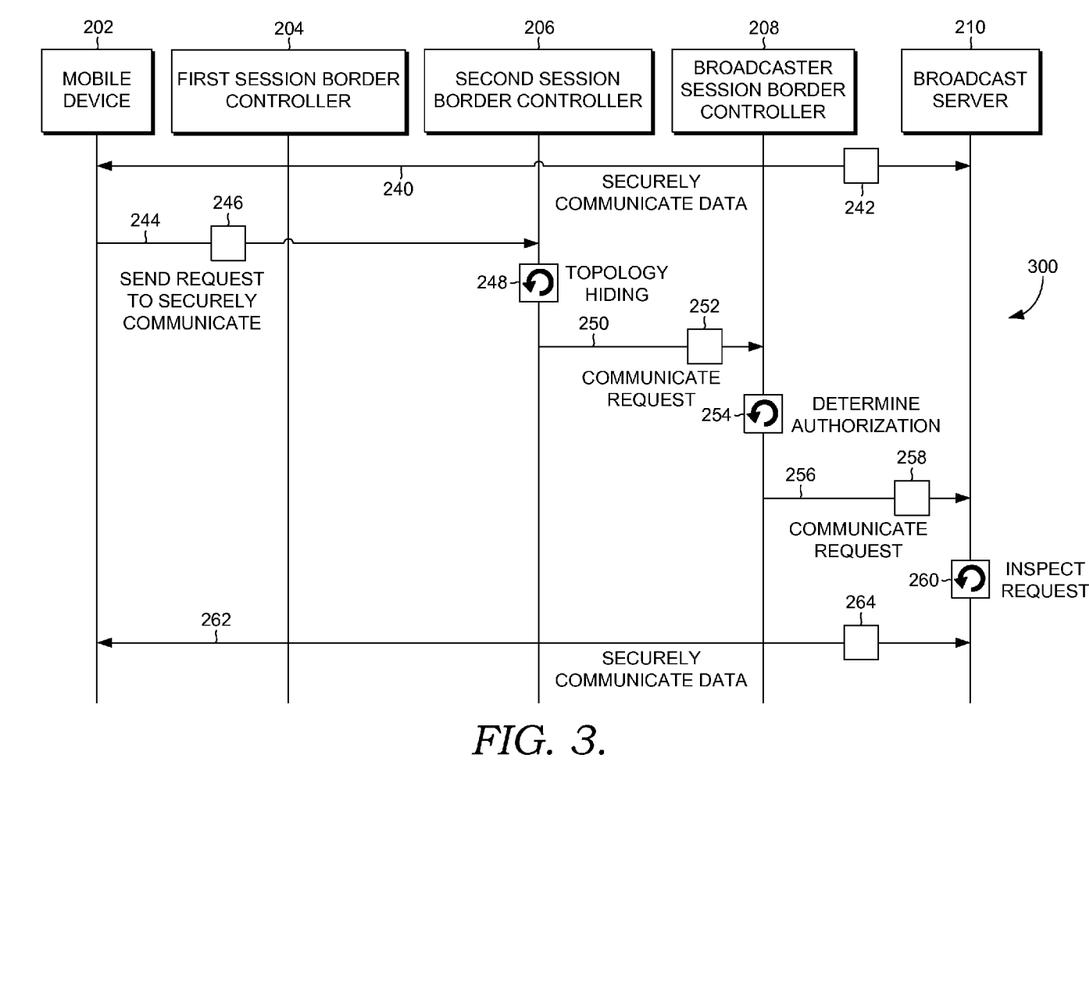
FIG. 3, a continuation of FIG. 2, depicts a communications flow diagram for securely communicating a media stream in accordance with an embodiment of the present invention.

Turning now to FIG. 3, a continuation of FIG. 2, that depicts a communications flow diagram for securely communicating a media stream from a mobile device to an endpoint as generally depicted by numeral 300. The communications flow diagram 300 includes the Mobile device 202, the first session border controller 204, the second session border controller 206, the broadcaster session border controller 208, and the broadcast server 210 previously discussed with reference to FIG. 2.

The mobile device 202 securely communicates 240 a streaming media 242 to the broadcast server 210. Secure communication utilizes the keys generated 232 to encrypt and decrypt the media stream. The communication from the mobile device 202 includes wireless communication to the wireless transceiver 104 coupled to the first network 106. Upon the mobile device 202 transferring from the wireless transceiver 104 to the second wireless transceiver 116, the secured communication 240 can no longer occur through the first network 106 or the first session border controller 204. The mobile device 202 communicates 244 a request 246 to securely communicate a media stream. The media stream may be the media stream 242 that is postponed as a result of the session changing from the first network 106 to the second network 118. In an alternative embodiment, the media stream is a different media stream from media stream 242.

The request 246 is received by the second session border controller 206. The second session border controller 206 utilizes a topology hiding functionality 248 to hide the topology of the second network 118. The second session border controller 206 communicates 250 a modified request 252 that is received by the broadcaster session border controller 208. The broadcaster session border controller 208 determines if the mobile device 202 is authorized to communicate with the broadcast server 210. The broadcaster session border controller 208 communicates 256 a request 258 to the broadcast server 210. The request 258 is comparable if not the same as modified request 252.

The broadcast server 210 inspects the request 260. The inspection includes identifying the unique identifier of the mobile device 202 that is included with the request. For example, if the request 258 is a SIP invite, a SIP client of the broadcast server would be the endpoint identified in the SIP invite and the SIP client would utilize the signaling information of the SIP invite to obtain the unique identifier of the mobile device 202.

The request inspection 260 additionally includes querying the broadcast server to determine if the unique identifier associated with the request 258 is associated with a unique identifier; for example, an identifier storage 114 that stores 238 an identifier and key based on a previous request 226. The inspection 260 will identify the key associated with the mobile device 202 to facilitate the decryption of streaming media communicated from the mobile device 202 without having to reestablish the session keys or without having to regenerate the keys 232.

The secure communication 262 between the mobile device 202 and the broadcast server 210 of a media stream 264 is by way of the second network 118 and the second session border controller 120; while utilizing the generated keys 232 established earlier in the session by way of the first network 106.

The communications depicted in FIG. 2 and FIG. 3 are not limiting as to the scope, but instead merely depict an exemplary communications flow for securely communicating a media stream as a mobile device 202 transitions from a first network 106 to a second network 118.

Figure 4:
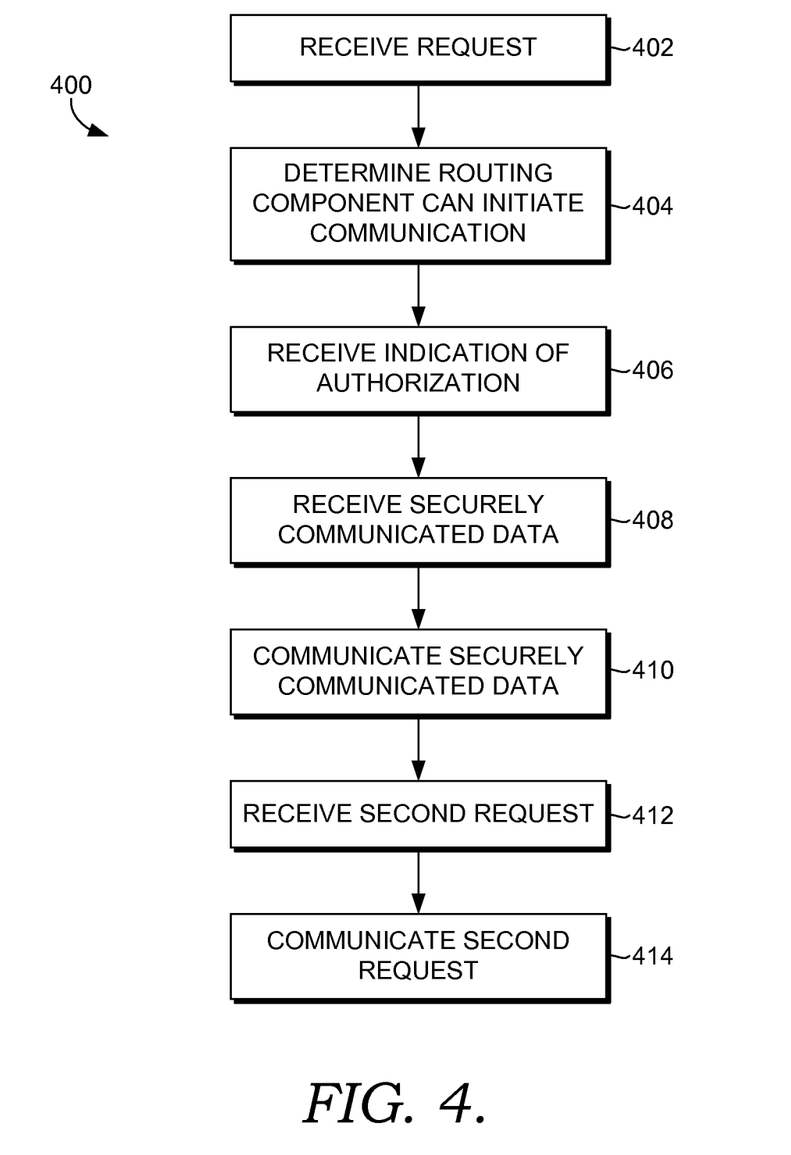
FIG. 4 depicts a method for securely communicating a media stream as a mobile device transitions from a first network to a second network in accordance with an embodiment of the present invention.

Turning now to FIG. 4, an illustrative method according to an embodiment for securely communicating a media stream as a mobile device transitions from a first network to a second network and referenced generally by the numeral 400.

At a step 402, the broadcaster session border controller 110 receives a request to securely communicate a media stream to an endpoint, such as the broadcast server 112. The request includes a unique identifier of the mobile device 102. In an exemplary embodiment, the request is a SIP invite and the unique identifier is associated with the signaling information of the SIP invite. The request is communicated from the mobile device 102 by way of the first network 106.

At a step 404, the broadcaster session border controller 110 determines whether the secure communication can be initiated with the requested end point. For example, the broadcaster session border controller 110 will determine if the requested end point is registered with the broadcaster session border controller 110. In an exemplary embodiment, the broadcast server 112 is the endpoint, and the broadcast server 112 includes a SIP client that registers with the broadcaster session border controller 110 by way of an IP enabled connection. The determination also includes querying a permissions list to determine if the mobile device 102 is authorized to communicate and at what level of authorization it is allowed to communicate with the end point.

At a step 406, the broadcaster session border controller 110 receives an indication from the endpoint that the mobile device 102 is authorized to securely communicate with it. The end point then receives the request that includes a unique identifier of the mobile device 102. The endpoint associates the unique identifier with a unique key that has been generated to encrypt and decrypt communications with the mobile device 102.

At a step 408, the broadcaster session border controller 110 receives securely communicated data from the mobile device 102. The securely communicated data can include a media stream, but it is not required to include a media stream. The communication is secured in a variety a ways including the use of symmetric cryptography keys and IPsec protocols.

At a step 410, the broadcaster session border controller 110 communicates the securely communicated data to the end point. The broadcaster session border controller 110 serves as a routing component to rout the requests, data, and information to the proper end points. At a step 412, the broadcaster session border controller 110 receives a second request to securely communicate the media stream from the mobile device 102 to an end point. The second request is communicated incident to the mobile device 102 transitioning from communicating by way of the first network 106 to the second network 118. The second request includes signaling information that includes the unique identifier of the mobile device 102.

At a step 414, the broadcaster session border controller 110 communicates the second request to the end point. In an exemplary embodiment, the broadcaster session border controller 110 evaluates the second request to determine if the mobile device 102 is authorized to communicate with the end point. The end point performs an inspection on the second request. The inspection includes determining the source identifier, such as the unique identifier of the mobile device 102, of the second request. The inspection also includes comparing the identified source identifier with the unique identifier previously identified. For example, the broadcast server is associated with an identifier storage 114 that stores unique identifiers with associated session keys, such as symmetric keys. The broadcast server 112 queries the identifier storage 114 to determine if the source identifier corresponds to a stored unique identifier and session key. The inspection also includes utilizing the unique key that is associated with the unique identifier to decrypt any data received from the mobile device 102 that is encrypted with a compatible key.

Figure 5:
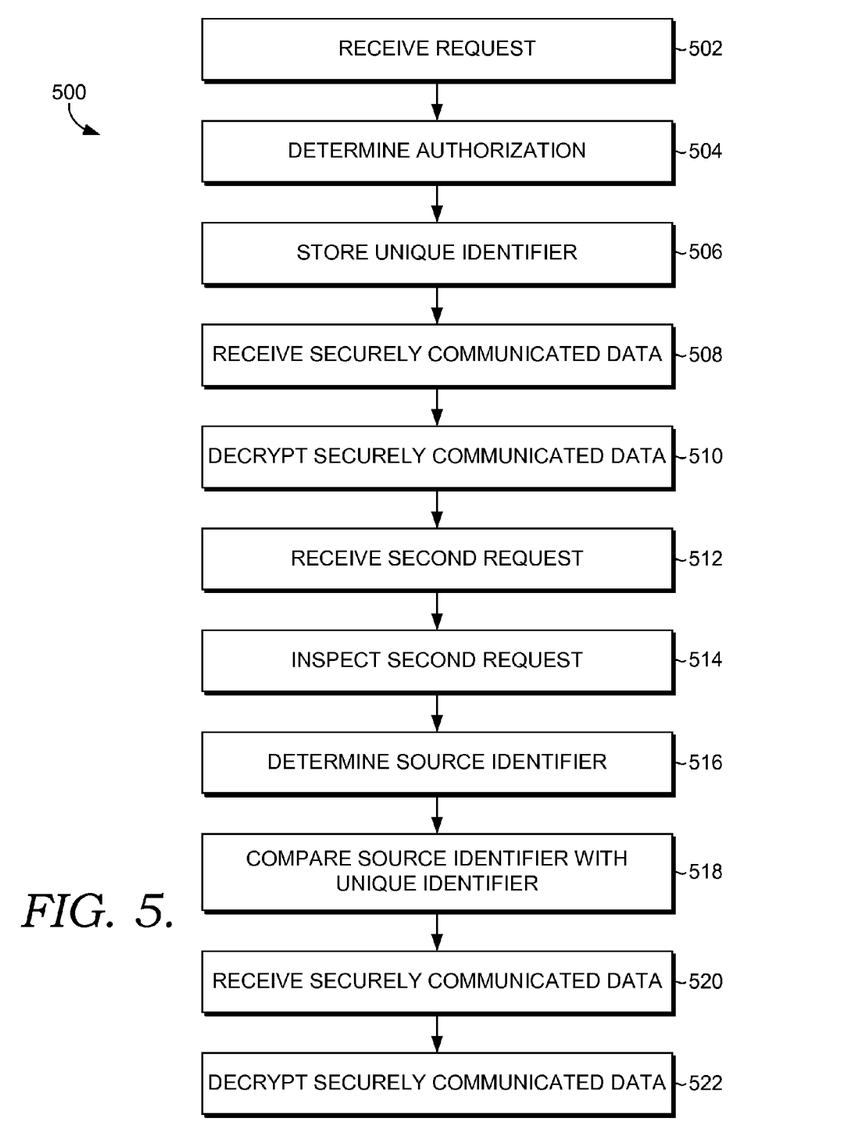
FIG. 5 depicts a second method for securely communicating a media stream as a mobile device transitions from a first network to a second network in accordance with an embodiment of the present invention.

Turning now to FIG. 5, an illustrative method according to an embodiment for securely communicating a media stream as a mobile device transitions from a first network to a second network and referenced generally by the numeral 500.

At a step 502, an end point, such as a broadcast server 112, receives a request from the mobile device 102 to initiate secure communication with the endpoint. The request, in an exemplary embodiment, is a SIP request. The request also includes a unique identifier of the mobile device 102. At a step 504, the end point determines if the mobile device 102 is authorized to securely communicate with the end point. The secure communication, as previously discussed, can involve the use of cryptography to protect the content of the communication from being deciphered by those who are not authorized. The authorization is determined by evaluating the unique identifier associated with the request.

At a step 506, the end point stores the unique identifier in association with a unique key that is useable to encrypt and decrypt communications with the mobile device 102. The unique key is generated to facilitate secure communication among the end point and the mobile device 102. At a step 508, the end point receives securely communicated data from the mobile device 102. The securely communicated data can include a media stream, such as video capture by the mobile device that is intended to be utilized by the broadcaster. For example, the mobile device 102 can capture a breaking news story with an associated video- and audio-capturing device where the user of the mobile device 102 desires to communicate the video to a new broadcaster in a secure manner to prevent other interested parties from intercepting the video communication. In an additional exemplary embodiment, the securely communicated data is a phone conversation or recorded audio that includes sensitive information that must be communicated in a secure manner.

At a step 510, the end point decrypts the securely communicated data. In an exemplary embodiment, the end point is associated with a computing device that utilizes the unique key stored at step 506 to decrypt the securely communicated data. At a step 512, the end point receives a second request to securely communicate data from the mobile device 102. The second request results from the mobile device 102 transitioning from the first network 106 to the second network 118. For example, the first network 106 is a wireless telecommunications network operated by a first carrier (service provider) and the second network 118 is a wireless telecommunications network operated by a different carrier. In an additional embodiment, the first network 106 is a wireless Internet provider and the second network 118 is a second wireless Internet provider.

At a step 514, the end point inspects the request. At a step 516, the end point determines a source identifier associated with the second request. As previously discussed, the source identifier can be a unique identifier of the mobile device, such as the unique identifier received in association with the first request. At a step 518, the end point compares the source identifier determined at step 516 with one or more unique identifiers stored at step 506. The comparison is performed to match the mobile device 102 with the unique key previously associated with the mobile device when it was utilizing the first network 106. In an exemplary embodiment, the end point utilizes a SIP client to send a SIP message to the mobile device 102 that the associated key has been identified and that the mobile device is able to begin securely communicating the data.

At a step 520, the end point receives the securely communicated data from the mobile device 102. The securely communicated data at step 520, in an exemplary embodiment, is the continuation of the securely communicated data received at step 508. Therefore, the transition from the first network 106 to the second network 118 appears to be transparent. This allows for a mobile device 102 to transition from a first network 106 to a second network 118 while maintaining a secure communication and not requiring a renegotiation of the cryptography keys utilized to securely communicate the data. At a step 522, the end point decrypts the securely communicated data received at step 520. In an exemplary embodiment, the data is decrypted utilizing the same key utilized to decrypt data at step 510.

Figure 6:
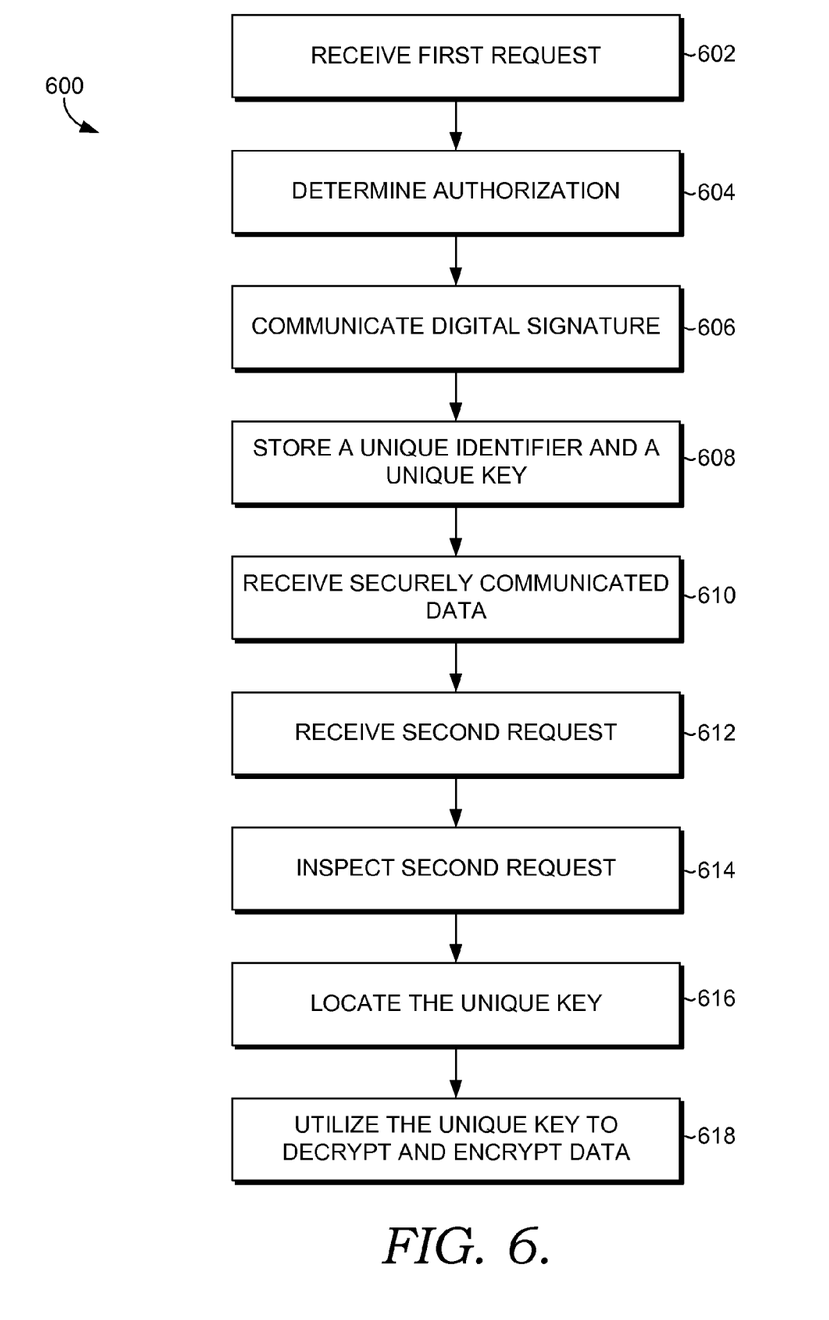
FIG. 6 depicts a third method for securely communicating a media stream as a mobile device transitions from a first network to a second network in accordance with an embodiment of the present invention.

Turning now to FIG. 6, an illustrative method according to an embodiment for securely communicating a media stream as a mobile device transitions from a first network to a second network and referenced generally by the numeral 600.

At a step 602, the end point receives a first request from a mobile device 102 to initiate secure communication by way of a first network. The first request includes a unique identifier of the mobile device 102. At a step 604, the end point determines if the mobile device 102 is authorized to communicate with the end point. As previously discussed, in an exemplary embodiment, a mobile device 102 is authorized to communicate with the end point if the mobile device 102 subscribes to a particular service or is associated with the end point. The end point is registered with a routing device that intercepts the request.

At a step 606, the end point communicates a digital signature with the mobile device as part of the establishment of a secure communication. The digital signature allows for the mobile device 102 to verify, with a third party, the identity of the broadcast server and the information communicated therefrom. At a step 608, the end point stores the unique identifier of the mobile device 102 that was associated with the first request received at step 602. In addition to storing the unique identifier, the end point also stores a unique key that facilitates the secure communication between the mobile device 102 and the end point.

At a step 610, the end point receives securely communicated data from the mobile device 102. In an exemplary embodiment, the communication is secured utilizing IPsec, TLS, and cryptography. At a step 612, the end point receives a second request to securely communicate the data. The second request is communicated by the mobile device 102 incident to the mobile device transitioning from the first network 106 to the second network 118. The requests, in an exemplary embodiment are communicated in a secure manner, but in an alternative embodiment the requests are not communicated securely. If the request is securely communicated, the communication may utilize IPsec and/or TLS. The second request is communicated by way of the second network 118.

At a step 614, the end point inspects the second request. The inspection includes identifying a unique identifier associated with the second request. At a step 616, the end point locates the unique key stored at step 608 that is associated with the unique identifier identified during the inspection at step 614. At a step 618, the end point utilizes the unique key located at step 616 to decrypt and encrypt data communicated with the mobile device 102.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. One or more nontransitory computer-readable media having computer-executable instructions embodied thereon for performing a method of maintaining a secure communication of a media stream that is sent from a mobile device to a routing component that is coupled to an end point, the secure communication being maintained as the mobile device transitions from communicating with a first network to communicating with a second network, wherein the method includes processing signaling information received from the mobile device, and the method comprising:
   receiving a request from the mobile device, by way of the first network, to initiate a secure communication with the end point, wherein the mobile device is identifiable by a unique identifier;
   determining whether the routing component is capable of initiating the secure communication with the end point;
   receiving an indication from the end point that it has determined that the mobile device is authorized to securely communicate with it, and wherein the end point stores the unique identifier incident to authenticating the mobile device, and associates the unique identifier with a generated unique key that is usable to decrypt any securely communicated data received from the mobile device;
   receiving securely transmitted data from the mobile device;
   communicating the securely transmitted data to the end point;
   incident to the mobile device determining to transition from communicating with the first network to communicating with the second network, receiving from the mobile device a second request, by way of the second network, to securely communicate with the end point;
   communicating the second request to the end point, which performs an inspection process that includes,
   A) determining from the second request a source identifier that identifies a source of the second request;
   B) comparing the source identifier with the unique identifier; and
   C) when the source identifier matches the unique identifier, then utilizing the unique key to decrypt any data received from the source without regenerating the unique key.

2. The media of claim 1, wherein the first network is operated by a first wireless carrier and the second network is operated by a second wireless carrier.

3. The media of claim 1, wherein the first request and the second request are communicated by way of the signaling information from the mobile device.

4. The media of claim 3, wherein the signaling information is encrypted or decrypted utilizing a second key.

5. The media of claim 1, wherein the request is an invitation compatible with a version of Session Initiation Protocol (SIP).

6. The media of claim 2, wherein the secure communication utilizes symmetric session keys to encrypt and decrypt the securely transmitted data.

7. The media of claim 6, wherein the symmetric session keys utilize a block cipher Advanced Encryption Standard (AES).

8. The media of claim 1, wherein the determining whether the routing component is capable of initiating the secure communication with the end point further comprises verifying the endpoint previously registered with the routing component.

9. The media of claim 1, wherein the routing component is adapted to perform session-border controller operations.

10. The media of claim 1, wherein the routing component facilitates topology hiding for communications communicated from the end point.

11. One or more nontransitory computer-readable media having computer-executable instructions embodied thereon for performing a method of maintaining a secure communication of a media stream that is sent from a mobile device to a routing component that is coupled to an end point, the secure communication being maintained as the mobile device transitions from communicating with a first network to communicating with a second network, wherein the method includes processing signaling information received from the mobile device, and the method comprising:
   receiving a request from the mobile device via the first network, by way of the routing component, to initiate a secure communication with the end point, wherein the mobile device is identifiable by a unique identifier;
   determining the mobile device is authorized to securely communicate with the end point, and wherein the end point stores the unique identifier incident to authenticating the mobile device, and associates the unique identifier with a generated unique key that is usable to decrypt and encrypt data communicated with the mobile device;
   receiving securely transmitted data from the mobile device;
   incident to the mobile device determining to transition from communicating with the first network to communicating with the second network, receiving from the mobile device a second request via the second network to securely communicate with the end point;
   inspecting the second request, wherein the inspection process includes,
   A) determining from the second request a source identifier that identifies a source of the second request;

B) comparing the source identifier with the unique identifier; and

C) when the source identifier matches the unique identifier, then utilizing the unique key to decrypt any data received from the source.

12. The media of claim 11, wherein the first network is operated by a first wireless carrier and the second network is operated by a second wireless carrier.

13. The media of claim 11, wherein the request and the second request are communicated by way of signaling information from the mobile device.

14. The media of claim 13, wherein the request is an invitation utilizing a protocol compatible with Session Initiation Protocol (SIP).

15. The media of claim 11, wherein the routing component is adapted to perform session-border controller operations.

16. The media of claim 11, wherein the secure communication utilizes symmetric session keys to encrypt and decrypt the securely transmitted data.

17. The media of claim 11, wherein determining the mobile device is authorized to securely communicate with the endpoint includes confirming in a data store that the mobile device is allowed to securely communicate a media stream with the end point.

18. One or more nontransitory computer-readable media having computer-executable instructions embodied thereon for performing a method of maintaining a secure communication of a media stream that is sent from a mobile device to a routing component that is coupled to an end point, the secure communication being maintained as the mobile device transitions from communicating with a first network to communicating with a second network, wherein the method includes processing signaling information received from the mobile device, and the method comprising:

receiving a first request from the mobile device to initiate a secured communication utilizing, in part, the first network, wherein the first request includes a unique identifier of the mobile device;

determining the mobile device is authorized to securely communicate with the end point, wherein the endpoint is registered with the routing component;

communicating a digital signature to the mobile device;

storing in association with the unique identifier of the mobile device, a generated unique key that is usable to decrypt and encrypt data communicated with the mobile device;

receiving securely transmitted data from the mobile device;

receiving a second request from the mobile device to maintain the secured communication utilizing, in part, the second network, wherein the second request includes the unique identifier;

inspecting the second request, wherein the inspection process includes,

A) identifying the unique identifier; and

B) locating the unique key associated with the unique identifier;

utilizing the unique key to decrypt and encrypt data securely communicated between the mobile device and the end point.

19. The media of claim 18, wherein the first network is operated by a first wireless carrier and the second network is operated by a second wireless carrier.

20. The media of claim 18, wherein the unique identifier includes a selection from the following:

A) International Mobile Equipment Identity (IMEI),

B) Mobile Subscriber Integrated Services Digital Network Number (MSISDNN),

C) International Mobile Subscriber Identity (IMSI),

D) Electronic Serial Number (ESN), and

E) Phone Number.

* * * * *